March 26, 1957  R. G. WILDY  2,786,412
RECORD CARD CONTROLLED STATISTICAL MACHINES
Filed May 28, 1954  5 Sheets-Sheet 1
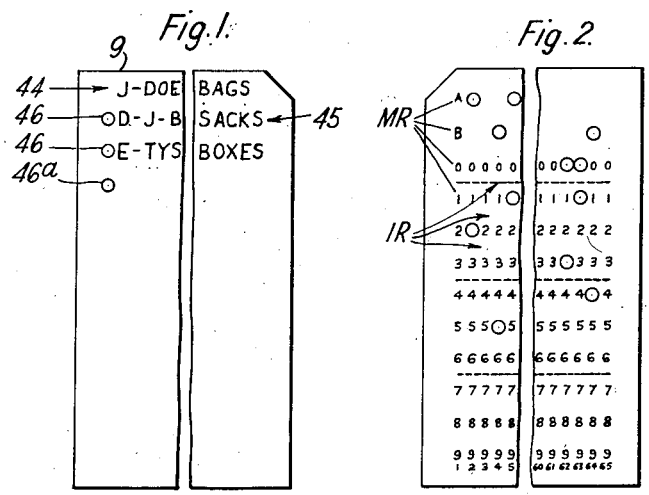
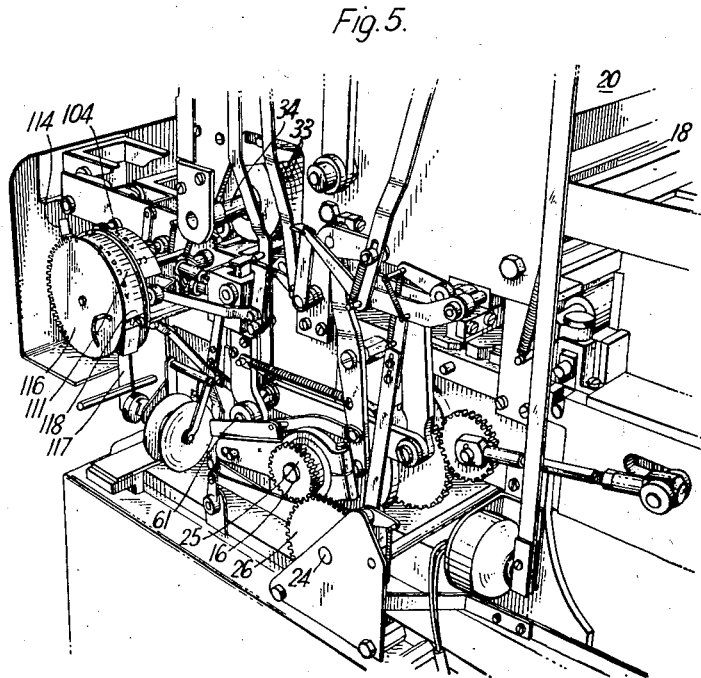
Inventor
RONALD G. WILDY
By March 26, 1957 R. G. WILDY 2,786,412
RECORD CARD CONTROLLED STATISTICAL MACHINES
Filed May 28, 1954 5 Sheets-Sheet 4
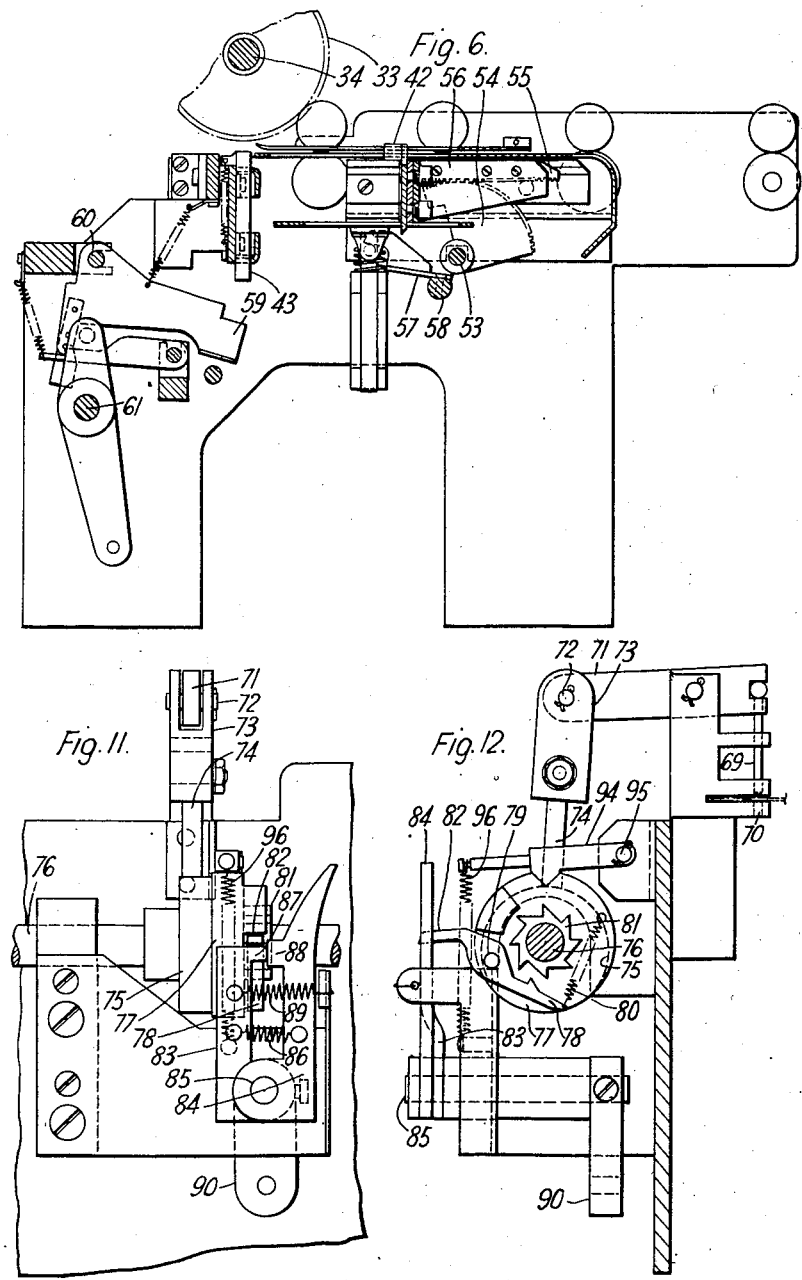

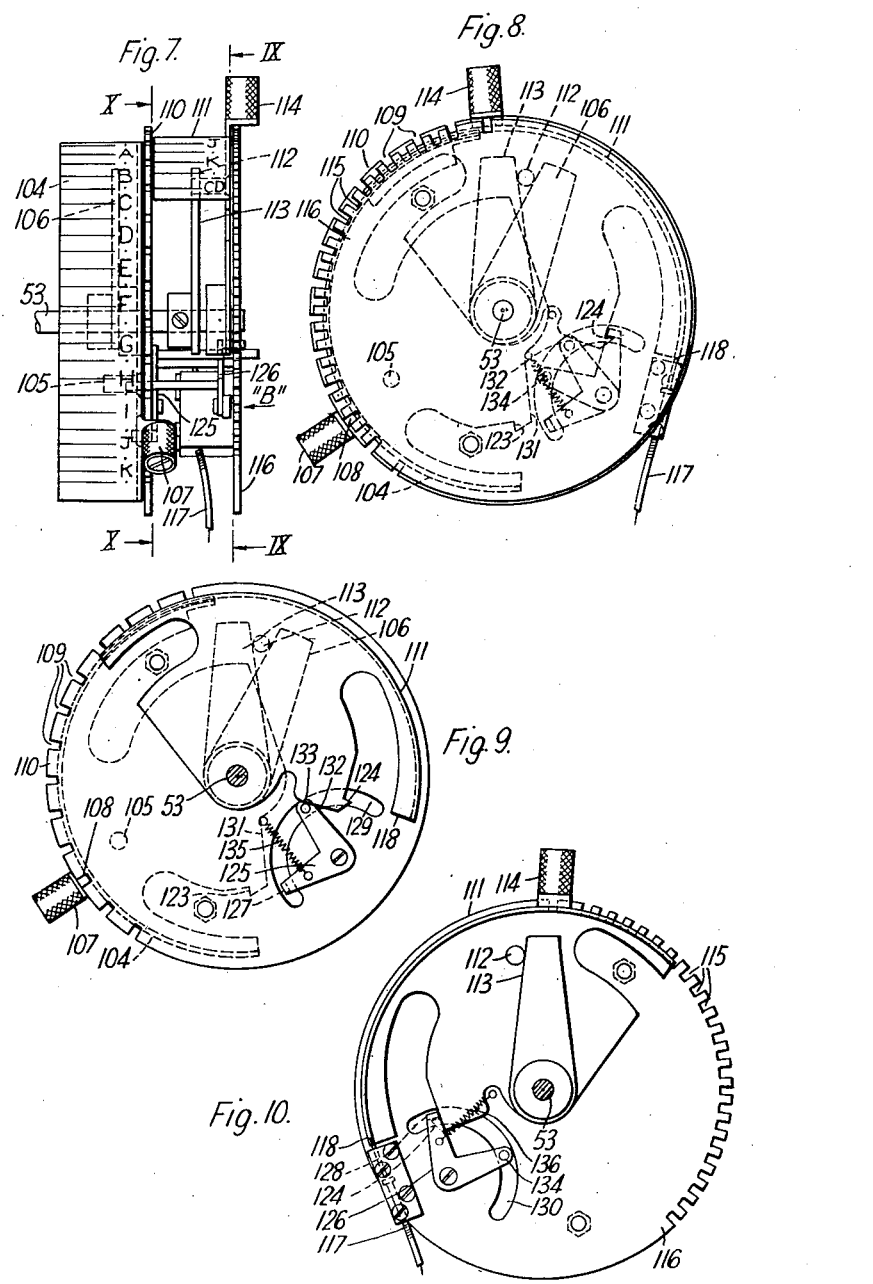

United States Patent Office 2,786,412
Patented Mar. 26, 1957

2,786,412

RECORD CARD CONTROLLED STATISTICAL MACHINES

Ronald Gordon Wildy, Addiscombe, Croydon, England, assignor to Powers-Samas Accounting Machines Limited, London, England, a British company Application May 28, 1954, Serial No. 433,251

Claims priority, application Great Britain June 12, 1953

16 Claims. (Cl. 101—93)

This invention relates to record card controlled statistical machines in which alternate impression-receiving and data-bearing cards are fed in succession from the input to the output ends of the machines and in which imprinting mechanism is operable in timed relation with the card-feeding means to imprint on an impression-receiving card an impression of data sensed from a data-bearing card. Such a machine will be referred to below as "a machine of the kind described."

In a machine of the kind described an impression-receiving card is fed once through the machine for each line of imprinting applied thereto and it may often happen in a succession of cards fed through the machine during a run thereof that the line positions at which imprinting is to be effected differ on different cards presented to the imprinting mechanism and it is one object of the present invention to provide in a machine of the kind described card stop control means operable under control of an impression-receiving card to effect positioning of the card stop in the appropriate line-imprinting position so that irrespective of the position of the last line of imprinting on the card when it is fed into the machine, the card will be correctly positioned in relation to the imprinting mechanism to receive the next line of imprinting.

According to the present invention a machine of the kind described comprises imprinting mechanism operable under control of a data-bearing record card to impart a line of imprinting to an impression-receiving card, a card stop selectively movable to locate an impression-receiving card in a line position thereof to receive an impression from the imprinting mechanism, and card stop control means conditioned under control of an impression-receiving card selectively to position the card stop to arrest the impression receiving card in the appropriate line-imprinting position thereof.

In order that the invention may be clearly understood one embodiment thereof will now be described, by way of example, with reference to the accompanying diagrammatic drawings in which:

Fig. 1 is a broken view of an impression-receiving card for use in a machine according to the invention, Fig. 2 is a broken view of a data-bearing card for use in a machine according to the invention, Fig. 3 is a side view, partly in section, of a machine according to the invention.

Fig. 4 is an end view of the machine looking in the direction of arrow A, Fig. 3, Fig. 5 is a pictorial view illustrating the hammer-firing mechanism for the imprinting mechanism and manually settable devices for effecting setting of the card stops for arresting cards in imprinting positions thereof, Fig. 6 is a sectional elevation illustrating the card stop and hammer operating mechanism, Fig. 7 is an end elevation of manually settable devices operable independently one of the other to effect a setting of the card stop, Fig. 8 is a view looking in the direction of arrow B, Fig. 7, Fig. 9 is a section on line IX—IX, Fig. 7.

Fig. 10 is a section on line X—X, Fig. 7,

Fig. 11 is an elevation of a punch device cooperating with the hammer mechanism and the imprinting mechanism, and Fig. 12 is an end view, partly in section, of Fig. 11.

Figure 3:
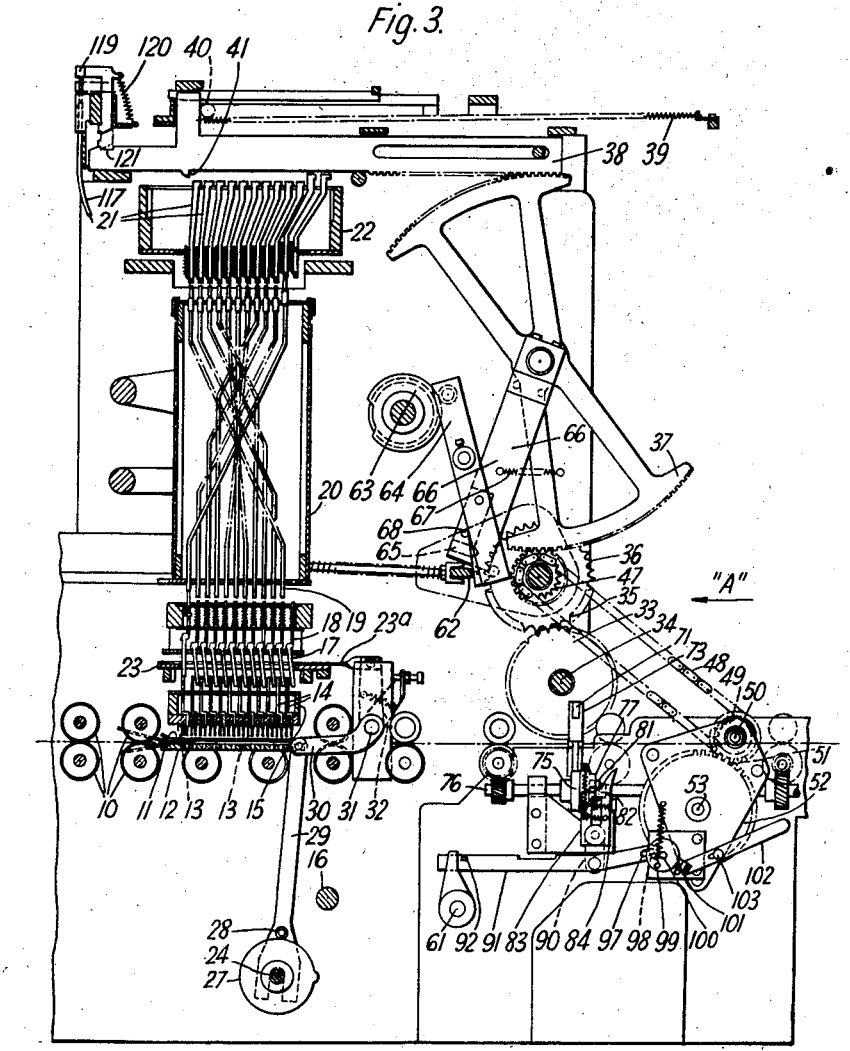

Referring to the drawings, Figs. 1 and 2 illustrate respectively an impression-receiving card 9 and a data-bearing card, and, for use in a machine according to the invention, a plurality of such cards are formed into a pile so that the impression-receiving and data-bearing cards alternate throughout the pile in a manner such that when the pile is placed in a magazine, not shown, at the input end of the machine the cards are fed in succession from the magazine in a manner such that an impression-receiving card is succeeded through the machine by a data-bearing card and data sensed from the data-bearing card is imprinted on the impression-receiving card which is fed immediately in precedence thereto. It will be understood that if all the impression-receiving cards are blank at the beginning of the run of a machine the card stop which locates the impression-receiving cards in a line position to receive an impression may be set manually and remain in the set position during the whole run of the pile of cards through the machine as the impressions to be made on the impression-receiving cards will, in such circumstances, all be affected in the same line-imprinting position on the impression-receiving card. It may, however, so happen that the pile of cards placed into the magazine at the input end of the machine contains impression-receiving cards some of which may have no previous impression made thereon while others may have differing numbers of lines of impressions made thereon. It will be readily understood that in such circumstances it will be necessary to modify the position of the card arresting stop relative to the imprinting mechanism according to the particular line position at which an impression is to be made on a particular card. It is primarily with this aspect of the operation of the machine that the present invention is concerned.

In machines of the kind described as employed heretofore it has been necessary to ensure that each of the impression-receiving cards included in a pile in the magazine at the input end of the machine has the last line of imprinting formed thereon in the same line position in order that the card stop may be pre-set to arrest the card in the appropriate new line-imprinting position.

The machine to which the present invention is applied is known in all its aspects and construction apart from the new features to be described in greater detail herein and as said general construction and mode of operation of the machine is well understood only such parts of the known apparatus will be described herein as are desirable to the understanding of the mode of operation of the apparatus fitted to the machine in accordance with the present invention.

Referring to Fig. 3, a pile of alternating impression-receiving cards and data-bearing cards are placed into a magazine, not shown, from the bottom of which the cards are fed in known manner, one at a time, to pairs of feeding rollers 10, which, in the usual manner, feed the cards one at a time between upper and lower perforated plates 11, 12 between which the card is located by a card stop, not shown, and which retains the card within the sensing chamber formed by the plates 11 and 12 while a sensing operation is performed on the card. After the sensing operation the card stop, as is customary, is moved out of engagement with the leading edge of the card which is then fed out of the sensing chamber and is delivered to further pairs of feed rollers which, if the card is an impression-receiving card, feeds the card into engagement with a card stop, to be described below, which operates in conjunction with an imprinting mechanism, but which, if the card is a data-bearing card, feeds such card past the imprinting position and delivers it into a card receiver, not shown. It will be understood that the impression-receiving cards, after receiving an impression, are also delivered into a card receiver which, if desired, may be the same receiver as that to which the data-bearing cards are delivered but which, preferably, in a receiver other than that to which the data-bearing cards are delivered.

For the purpose of describing the apparatus according to the present invention it is assumed that the data-bearing cards have data recorded thereon by perforations punched therein although it will be understood that, if desired, data may be recorded in other known manner such, for example, as by electrically conductive marks or by marks which can be magnetised or employed to co-operate with a magnetic sensing device, or the marks may be of a character for use with a photo-electric or other suitable sensing device.

The sensing device illustrated in the drawings is, in essence, of known character in that it embodies for each vertical card column to be sensed a column of sensing pins 13, but it differs from such known forms of sensing device in that one predetermined column of sensing pins is formed by pins 14 which, as illustrated in Fig. 3, are cranked so that the sensing portions thereof are offset from the sensing pins 13 of the other columns of sensing pins. The extent by which the sensing portions of the pins 14 are offset is such that these pins will sense perforations formed in what are known in the art as "interstage" positions, that is the positions which occur between any two horizontal rows NR of data-indicating positions of a card. This can be understood by reference to Fig. 2 in which the interstage row positions are provided by the spaces IR. From Fig. 1 it will be observed that although the imprinting is formed on an impression-receiving card as distinct from a data-bearing card, the lines of imprinting are made in what would be the interstage row positions on a data-bearing card.

The sensing pins 13, 14 are supported as is customary in a frame 15 which is vertically reciprocable by well-known mechanism, not shown, operated from the main shaft 16 of the machine. Also, as is well known, the sensing pins of each column are arranged for co-operation with intermediate connecting elements 17 arranged in turn to co-operate with transmission rods 18. The transmission rods 18, also in known manner, are arranged to co-operate with transmission wires 19 in a connection box 20, the upper end of each wire 19 being arranged, on lengthwise movement of the wire, to effect operation of a stop 21 of a stop basket 22. The operation of this mechanism is well understood in the art and it will therefore be sufficient herein to mention that if, during the sensing of a card, a sensing pin 13 or 14 should pass through a perforation formed in a card, on operation of a shutter 23 or 23a, the appropriate intermediate connecting element 17 will be moved to a position as illustrated at the extreme left of the column in Fig. 3 so that when the pin box 15 is raised the appropriate wire 19 will be moved lengthwise to set-up a stop 21 as illustrated by the second stop from the right in Fig. 3. It is to be noted, however, that the reversal of the order of the stops in relation to the sensing pins, as shown in Fig. 3, is applicable only to the predetermined column of sensing pins which contains the sensing pins 14 and that the order of the stops 21 for columns of sensing pins other than the said predetermined column is the reverse of that shown in Fig. 3.

The shutter 23 co-operates with the elements 17 for all the columns of sensing pins 13 and is slotted to avoid the elements 17 for the sensing pins 14. The shutter 23a co-operates only with the elements 17 for said predetermined column of sensing pins 14 and, as can be seen from Fig. 3, rests on the shutter 23. The shutter 23 for the columns of pins 13, operates once for each sensing operation, that is once for each revolution of the main shaft 16, such operation being effected by the usual mechanism not shown, but the shutter 23a for the column of sensing pins 14 is operated only once for each two revolutions of the main shaft 16. This operation of the shutter 23a for the column of pins 14 is effected through an auxiliary shaft 24 which is driven from the main shaft 16 through gears 25, 26, Fig. 5, in a manner such that the shaft 16 completes two revolutions for each revolution completed by the auxiliary shaft 24, in other words the angular velocity of shaft 24 is one-half that of shaft 16. Secured to the shaft 24 is a cam 27, Fig. 3, which co-operates with a cam follower 28 on a link 29 connected to an arm 30 secured to a rocking spindle 31 to which is also secured an arm 32 connected to the shutter 23a for the column of sensing pins 14. The arrangement is such that the shutter 23a is moved to the left as viewed in Fig. 3 during the sensing of an impression-receiving card and remains in this position until the succeeding data-bearing card is located in the sensing chamber and has been sensed by the column of sensing pins 13 when it will be restored to the inactive position thereof, that is to the right as viewed in Fig. 3, together with the shutter 23 co-operating with the columns of sensing pins 13. It will, therefore, be understood that any setting which may have been determined by the pins 14 during the sensing of an impression-received card will, by shutter 23a, be retained by the intermediate connecting elements 17 for that column during the next sensing operation when a data-bearing card is being sensed.

Figure 4:
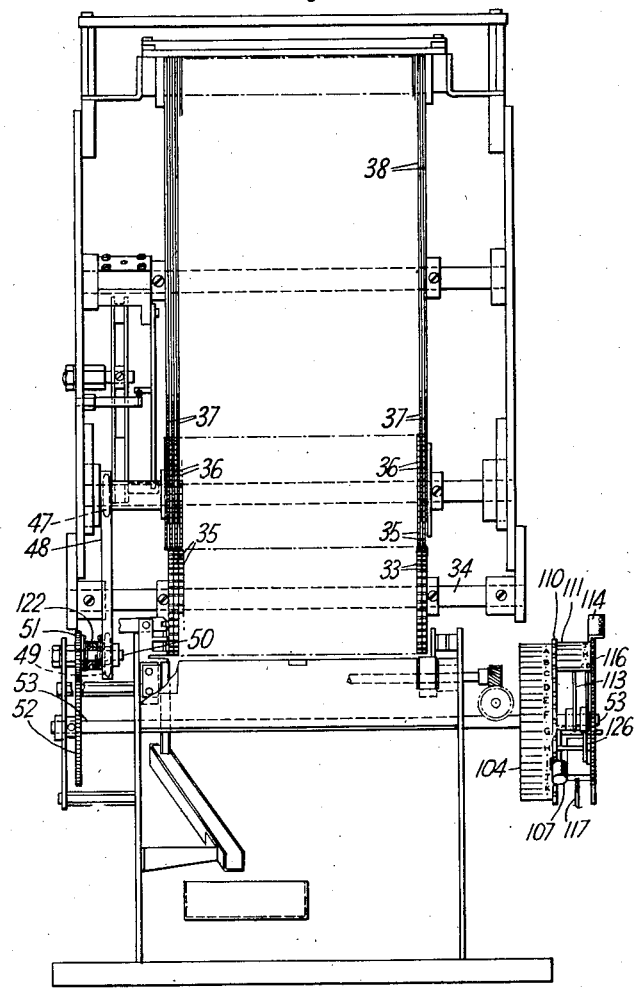

In the machine illustrated in the drawings, the imprinting mechanism comprises a plurality of type wheels 33, Fig. 4, one for each column of sensing pins 13. If desired, however, any other suitable form of imprinting mechanism may be employed, for example the imprinting mechanism may comprise, for each column of sensing pins 13, a stylus in the form of a wire which, under card control, is operated in a manner such as to produce on the impression-receiving card a character defined by a plurality of dots.

The type wheels 33, as is customary, are freely rotatable about a spindle 34 by sprockets 35 each of which carries a gear wheel 36 which meshes with toothed members 37 each of which also meshes with a toothed rack 38 movable, in known manner, lengthwise under control of a spring 39. A control bar 40 is provided, as is customary, to return the toothed racks 38 to the inactive positions thereof, that is the position illustrated in Fig. 3.

Each toothed rack is provided with an abutment 41 for co-operation with selected ones of the stops 21 of the stop basket 22 so that, as will be well understood, the forward position of a rack 38 is determined by an active stop 21 when the control bar 40 is operated to permit the racks 38 to be moved to the right, as viewed in Fig. 3, under control of their springs 39. The stops 21 in the columns thereof which are actuated under control of sensing pins 13 are disposed in the reverse order from that shown in Fig. 3 this being the customary and usual arrangement of the stops which control the selection of the type characters on the type wheels 33. The column of stops 21 which are controlled by the sensing pins 14, however, are, as mentioned above, provided solely to determine automatically the position at which a card stop 42, Fig. 6, is located in relation to the imprinting mechanism, that is, in the machine herein described, in relation to the striking bars 43, Fig. 6, which in the customary manner, effect the imprinting of a character on a card by striking the card against a type element on a type wheel 33. The first line-imprinting position on an impression-receiving card is the line 44, Fig. 1, and is the line which is nearest the trailing edge of the card 9 in the direction in which the card passes through the machine. Accordingly when imprinting is to be effected in this line position the card stop is located at its furthermost position from the striking bars 43, as shown in Fig. 6, and this position of the card stop 42 is determined by the stop 21 which is at the extreme right of the column shown in Fig. 3 and is a stop which is supported permanently in the active position thereof for engagement by the abutment 41 on the rack 38 for the column of stops 21 which is conditioned by the sensing pins 14. Thus, if none of the other stops of the column is raised, on operation of the control bar 40 the rack 38 for the column of stops 21 conditioned by the pins 14 will move to the right, as viewed in Fig. 3, together with the remainder of the racks 38 which co-operate with columns of stops 21 conditioned by the sensing pins 13 will be arrested by the permanently active stop of the column so that the impression-receiving card will be arrested by the stop in the first line-imprinting position as indicated at 44, Fig. 1.

If it is assumed that the first line of imprinting has been effected and it is desired automatically to position the card stop 42 to arrest an impression-receiving card in the second line-imprinting position as indicated at 45, Fig. 1, the impression-receiving card will, prior to its being inserted into the magazine at the input end of the machine, be provided with a perforation 46 in the interstage position at which the second line of imprinting is to be effected. This perforation 46 will be sensed by the sensing pin 14, at the extreme left as viewed in Fig. 3, so that, as illustrated in Fig. 3, there is raised the stop 21 next to the permanently active stop 21. Thus, when the racks 38 are released, the abutment 41 will advance only until it is arrested by the stop 21 which is second from the right, as viewed in Fig. 3, and the card stop 42 will be positioned to locate the impression-receiving card in the second line-imprinting position 45 to receive an impression of data sensed from the next succeeding data-bearing card. It will be understood that by providing a succession of holes 46 as illustrated in Fig. 1, each hole being produced only after imprinting of a line or simultaneously with the imprinting, the position at which the impression-receiving card is arrested each time it is fed through the machine can be automatically determined. Thus in Fig. 1 the hole 46a indicates that imprinting is to be effected in the fourth line position during the next passage of the card through the machine.

The rack 38 which co-operates with the column of stops 21 conditioned by the sensing pins 14 also co-operates with a toothed member 37 which meshes with a gear wheel 36, but this gear wheel 36 is integral with a sprocket 35 to which is secured a further sprocket 47, Figs. 3 and 4, about which is passed a flexible connecting element 48, such as a chain, which connects the sprocket 47, with a sprocket 49 rotatable on a stub spindle 50, Figs. 3 and 4. Also rotatable on the spindle 50 is a gear wheel 51 which meshes with a gear wheel 52 secured to a rocking shaft 53 supported by the side frames of the machine. Secured to the shaft 53 is a toothed sector 54, Fig. 6, which is in mesh with a toothed rack 55 secured to a carriage 56 by which the card stop 42 is supported. As is customary, the card stop 42 is supported by the carriage 56 to be movable relative thereto into and out of the path of cards passing through the machine, the movement of the card stop 42 in a vertical direction being controlled, in known manner, by a rocking arm 57 supported by a rocking shaft 58, rocking of which is effected from the main shaft of the machine by known mechanism, not shown. The hammer mechanism for firing the striking bars 43 is well-known and will not be described in detail herein, but the hammer 59 is pivoted at 60 and operation of the hammer is controlled by a hammer-firing shaft 61 which, in well-known manner, effects operation of the hammers at the appropriate time when a card is located in position beneath the type wheels 33 to receive an impression therefrom.

The type wheels 33 are aligned, as is customary, by an aligner bar 62, Fig. 3, which is common to all the type wheels 33 being controlled by a cam 63, Fig. 3, and rocking arm 64 to co-operate with the sprockets 35 for the wheels 33. The sprocket 35 to which is connected the sprocket 47 for chain 48 is not, however, acted upon by the aligner bar 62 but is controlled by an aligning element 65 independent thereto and supported by an arm 66 pivoted on the shaft for the toothed members 37 being urged towards the sprocket by spring 67 and also controlled by the cam 63 through co-operation of a pin 68 carried by the arm 66 and engaged by the rocking arm 64, as illustrated in Fig. 3.

As was mentioned above, the automatic setting of the card stop 42 is controlled by a perforation 46 in the impression-receiving card and this perforation may, if desired, be formed by any suitable mechanism or device, but preferably is formed simultaneously with the imprinting of a line on the impression-receiving card. To this end there is provided on the machine a punch 69, Fig. 12, co-operating with a die 70, the punch being so positioned in relation to the striking bars 43 that the perforation formed by the punch is located in the next line position as is illustrated at 46a on the card shown in Fig. 1. The punch 69 is supported by an arm 71 pivoted at 72 and connected to a fork 73 which is fixed to the end of the strap 74 of an eccentric 75, freely mounted on a shaft 76 and connected with a plate 77 for movement therewith, the plate 77 also being freely rotatable about the shaft 76. The plate 77 has a pawl 78 pivoted thereto at 79 and urged by a spring 80 towards the teeth of a continuously rotatable driving member, shown as a toothed member 81, secured to the shaft 76 for rotation therewith. The shaft 76 is continuously rotated from the main drive of the machine and the pawl 78 has a tail 82 which is normally latched in the position shown in Fig. 12 so that the pawl is disengaged from the toothed member 81. The latching means for the pawl 78 comprises a first latch member 83 and a second latch member 84, the first latch member 83 being secured to a rocking spindle 85 for rocking movement therewith, and the second latch member 84 being freely supported by the spindle 85 the axis of which forms a common pivot for the two latch members. The second latch member 84 is urged towards the first latch member 83 by a spring 86, Fig. 11. The latch members respectively have formed thereon an abutment 87 and 88, Fig. 11, which together form a notch in which the tail 82 of the pawl 78 is normally located. The first latch member 83 is urged by a spring 89 to the normal position thereof as illustrated in Fig. 11 and is moved against the action of this spring by angular movement of spindle 85 in a counter-clockwise direction, as viewed in Fig. 11, such movement being imparted to the spindle 85 by an arm 90 secured thereto and connected to a link 91, Fig. 3, supported for lengthwise movement. The link 91 is provided with an abutment 92 to be engaged by an actuator arm 93 secured to the hammer-firing shaft 61. Accordingly, when the hammer-firing shaft 61 is rocked, clockwise as viewed in Fig. 3, to release the hammers 59, the actuator arm 93 is also moved clockwise thereby engaging the abutment 93 and moving the link 91, to the right as viewed in Fig. 3, thus rocking spindle 85 counter-clockwise so that the first latch member 83 is also moved counter-clockwise out of the path of the tail 82 of the pawl 78. At this time the second latch member 84 is prevented from following the movement of latch member 83 because the abutment 88 on member 84 is engaged against the side of pawl 78. When the restraint exercised by the first latch member 83 is removed from the tail 82, the pawl 78 is urged by its spring 80 into engagement with a tooth of the wheel 81 so that the plate 77 and eccentric 75 are rotated thus causing the eccentric strap 74 to effect rocking of arm 71 which depresses the punch 69 and makes a perforation in the card located in imprinting position by the card stop 42. The chips formed by the punch fell into chutes as illustrated in Fig. 4 by which they are delivered into a chip tray.

As soon as the tail 82 has been moved out of engagement with the abutment 88 on the latch member 84, the latch member 84, due to action of spring 86, follows the latch member 83 until it is again in abutting relation therewith and accordingly when the pawl has made one revolution its tail 82 is arrested by the upper edge of the abutment 88 so that the pawl is tripped out of engagement with the toothed member 81, or, if the first latch member 83 should at this time have been restored to its initial position, that is the position shown in Fig. 11, the tail will be arrested by the upper edge of the abutment 87 and will be located in the notch formed by the abutments 87 and 88. It will be understood that if the tail is arrested by the abutment 88 then, when the latch member 83 is restored to the initial or starting position thereof after tripping of the pawl by the latch member 84, the tail of the pawl 78 will slide off the abutment 88 and on to the abutment 87 to resume the position illustrated in Fig. 11. A detent arm 94, Fig. 12, pivoted at 95 is urged by a spring 96 into engagement with a detent in the edge of the plate 77 to locate the plate and eccentric in the starting position thereof.

Should it be desired not to employ the punch during operation of the machine there is provided a cut-out device whereby the punch is rendered inactive. The cut-out device comprises an extension of the link 91 in which is formed a slot 97, Fig. 3, co-operating with a pin 98 on a disc 99 pivoted at 100 and having connected thereto an arm 101 to which is pivotally connected a manually operable cut-out lever 102 the lever being also pivoted at 103. By depressing the cut-out lever 102, the abutment 92 on link 91 is raised to a position at which it cannot be engaged by the actuating arm 93. It will therefore be understood that with the lever 102 in the depressed or cut-out position thereof, on actuation of the hammer-firing shaft 61, the actuating arm 93 although being operated will not effect operation of the link 91 and so the punch 69 will not be operated.

From the foregoing it will be understood that the punch 69 comprises means operable simultaneously with the imprinting mechanism to make on the impression-receiving card an indication indicative of the next line-imprinting position on the card, which indication is capable of being sensed by a sensing element of the predetermined column of sensing elements 14 to condition the card stop control means. It will, however, be understood that if data is recorded on a card by means other than perforations formed in the card and the sensing device is of a kind as mentioned above for sensing marks or other data-indicating media other than perforations, then the punch may be replaced by a member capable of making on the card a mark suitable for sensing by the sensing device employed by the machine. Further, it will also be understood that if the imprinting mechanism is other than of the kind herein described and illustrated, for example if the imprinting device comprises, as mentioned above, a card controlled wire for each card column there will in such circumstances be no hammer-striking bars 43 and the clutch 78, 81 may be triggered to release the tail 82 of the pawl under card control by any suitable means such as a flexible cable formed by a Bowden wire, or by a solenoid, or other suitable electrically operated device actuated as the result of the sensing of a control position in a data-bearing card so that the means for making on the impression-receiving card an indication indicative of the next line-imprinting position on the card is operated simultaneously with the imprinting mechanism.

In the foregoing description it has been assumed that, in all instances, the user of the machine will wish to commence at the first line-imprinting position 44, Fig. 1, as controlled by permanently active stop 21, but it may sometimes happen that it is desired to make the first line of imprinting at a position later than that of the line position 44, the succeeding positions thereafter being controlled automatically as described above. In such circumstances, the card stop 42 can be manually preset to the desired first line-imprinting position by means of a first settable control drum 104, Figs. 4, 5 and 7 to 10, freely rotatable on the rocking shaft 53.

The drum 104 has secured thereto a stop pin 105, the pin being movable with the drum in a path concentric with and parallel to the axis of the rocking shaft 53 to be engaged by an arm 106 to predetermine the extent of angular movement of the shaft. The control drum 104 carries a locking device 107 which, in well-known manner, includes a spring-controlled plunger 108 for engagement in one of the slots 109 of a fixed plate 110. It will be understood that by withdrawing the plunger 108 of the locking device 107 from the slot 109 which locates the control drum 104 in the cut-out position, in which position the control drum is inactive, and by rotating the drum so that the plunger of the locking device can be located in a selected slot 109 the stop in pin 105 is moved clockwise, as viewed in Fig. 8, thus reducing the extent by which the arm 106 can be moved in a counter-clockwise direction, as viewed in Fig. 8, on rocking movement of the shaft 53. Thus, when the rack 38 moves to the forward position thereof without any of the normally inactive stops 21 having been moved to the active position thereof, the rack will tend to move the abutment 41 into engagement with the permanently active stop 21, but as the arm 106 is prevented by the stop pin 105 from moving through the angular distance by which it would be moved if the abutment 41 were moved into engagement with the permanently active stop 21 the rack 38 is prevented from moving to its fully forward position by co-operation between the arm 106 and the stop pin 105. If, however, the impression-receiving card should bear a line-indicating perforation indicative of a line-imprinting position later than that to which the card stop 42 has been pre-set by the control drum 104, then the arm 106 will not be moved into engagement with the stop pin 105 and the position of the card stop 42 will be determined by that stop 21 which is set up as a result of being conditioned by one of the sensing pins 14.

It may sometimes be desired to operate the machine solely by manually presetting the position of the card stop 42, the automatic card stop control means being cut out thereby to render it inoperative. To this end there is provided a second control drum 111 also freely supported by the shaft 53 and carrying an operating pin 112 which is normally engaged by a second arm 113 secured to the shaft 53. The second control drum 11 also carries a locking device 114 similar to the locking device 107 to co-operate with slots 115 formed in a fixed plate 116. When the locking device 114 is released from the cut-out position thereof, as shown in Figs. 8 and 10, and together with the control drum 11 is moved counter-clockwise, as viewed in Fig. 8, the movement of the control drum 111 permits operation of an interrupter device connecting the second control drum 111 with the card controlled card stop control means, the interrupter device being operative to render the card-controlled card stop control means ineffective.

The interrupter device comprises a Bowden wire 117, Figs. 3, 7, 8 and 10, one end of the inner wire thereof being engaged by an edge portion 118, Figs. 8 and 10, while the other end of the inner wire is engaged by a latch member 119, Fig. 3, supported for vertical sliding movement, and urged downwards by a spring 120. When the edge portion 118 is moved away from the inner member of the Bowden wire 117, the spring 120 pulls the latch member 119 downwards so that the latch member is engaged in a notch 121 formed in the rack 38, the latching position of latch member 119 being indicated in dotted lines in Fig. 3. Thus, while the control drum 111 remains in any position other than the cut-out position thereof, the latch member 119 remains in engagement with the notch 21 thereby rendering the rack 38 inactive. When the control drum 111 is restored to the cut-out position thereof, as shown in Fig. 8, the inner member of the Bowden wire 117 is operated by the edge portion 118 of the control drum to restore the latch member 119 to the inactive position thereof as shown in full lines in Fig. 3.

The latching of rack 38 by latch member 119 would effect locking of the shaft 53 and to prevent this the sprocket 49 is connected with gear wheel 51, Fig. 4, by a split coupling. The coupling comprises a driving peg, not shown, on the bosses of each of the sprocket 49 and gear wheel 51, the driving pegs being normally retained in contact one with the other by a helical spring 122. Thus, when the control drum 111 is moved from the cut-out position thereof, the helical spring 122 "winds-up" to permit the angular movement of the shaft 53 due to co-operation between the operating pin 112 and arm 113 and, on the control drum 111 being returned to the cut-out position thereof, the spring 122 unwinds to restore the shaft 53 to the starting position thereof.

It will be understood that it is undesirable that it should be possible to effect simultaneous setting of both of the control drums 104 and 111, or to effect setting of one while the other is in any position thereof other than its cut-out position, and to prevent this an interlocking device is provided between the drums. The interlocking device comprises for each drum a latching tooth 123 and 124 formed respectively on the control drums 104 and 111. To the fixed plates 110 and 116 respectively are pivoted a first and a second latch 125 and 126 carrying latching abutments 127, 128 which extend through arcuate slots 129, 130 in the fixed plates 110, 116. The control drums 104, 111 are provided respectively with camming members 131 and 132 for cooperation with latching pins 133, 134, the camming members acting when the control drums are in the cut-out positions thereof to engage the latching pins thereby to depress the latches about their pivots against the action of springs 135, 136 so that the latching abutments 127, 128 are disengaged from the latching teeth 123, 124. From Figs. 8, 9 and 10 it will be observed that the control drum 104 is depicted as being in a set position thereof with the result that the camming member 131 on control drum 104 has been disengaged from the latch pin 134 so that the spring 136 has moved the latching abutment 128 into co-operation with the latching tooth 124 thereby preventing angular movement of control drum 111 in the direction of setting thereof.

From Figs. 7, 8 and 10 it will be observed that the plate 116 has twenty-three slots 115 determining line-positions to which the card-stop 42 can be set manually by manipulation of control drum 111 and from Fig. 8 it will be seen that the pitch of slots 115 is one half that of slots 109 in plate 110. Thus in the apparatus illustrated in the drawings twelve line-printing positions can be determined by card control or by such control modified by operation of drum 104 and twenty-three line printing positions can be determined solely by manul manipulation of drum 111.

In the foregoing description the perforations 46 have been described as located in interstage positions on an impression-receiving card. It will, however, readily be understood that, if desired, the perforations 46 may be formed in normal row positions for sensing by a sensing device the columns of sensing elements for which all sense like row positions but with the predetermined column of sensing elements being subject to control as hereinbefore described, and that perforations 46 so formed may be employed to control the card-stop 42 to arrest cards in line imprinting positions which coincide with "normal" row positions on the card, or with interstage row positions.

I claim:

1. A machine of the kind described, comprising imprinting mechanism operable under control of a data-bearing record card to impart a line of imprinting to an impression-receiving card, a card stop selectively movable to locate an impression-receiving card in a line position to receive an impression from the imprinting mechanism, a sensing device including a plurality of sensing elements to sense each card fed through the machine, one of said sensing elements being effective only to sense line-determining indicia on impression-receiving cards and the others of the sensing elements being effective to sense data-indicating indicia on data-bearing cards and to condition said imprinting mechanism, and card stop control means conditioned by the said one sensing element selectively to position the card stop to arrest in the appropriate line-imprinting position thereof an impression-receiving card sensed by said sensing means.

2. A machine of the kind described, comprising imprinting mechanism operable under control of a data-bearing record card to impart a line of imprinting to an impression-receiving card, a card stop selectively movable to locate an impression-receiving card in a line position to receive an impression from the imprinting mechanism, a sensing device including columns of sensing pins to sense perforations formed in record cards, one said column of sensing pins being effective only to sense perforations formed in interstage positions of impression-receiving cards, retaining means co-operating with the sensing pins of said one column to retain a sensing effected thereby for a second sensing cycle of the sensing device during which the pins of the other columns thereof sense a data-bearing card, and card stop control means conditioned by the sensing pins of said one column selectively to position the card stop to arrest in the appropriate line-imprinting position thereof an impression-receiving card sensed by the said one column of pins during the sensing cycle preceding said second cycle.

3. A machine of the kind described, comprising imprinting mechanism operable under control of a data-bearing record card to impart a line of imprinting to an impression-receiving card, a card stop selectively movable to locate an impression-receiving card in a line position to receive an impression from the imprinting mechanism, a sensing device including columns of sensing pins to sense perforations formed in record cards, one said column of sensing pins being effective only to sense perforations formed in interstage positions of impression-receiving cards, a transmission rod aligned with each sensing pin for lengthwise movement thereby, an intermediate connecting element to effect co-operation between a sensing pin and its co-operating transmission rod, a first normally inactive shutter common to all connecting elements other than those co-operating with the sensing pins of said one column and operable during each sensing cycle of the sensing device to permit co-operation between its connecting elements and the sensing pins co-operating therewith and to restore the connecting elements to the inactive positions thereof, a second shutter common to all connecting elements co-operating with the sensing pins of said one column and operable during alternate sensing cycles of the sensing device to retain a sensing effected by the pins of said one column for a second sensing cycle during which the pins of the other columns thereof sense a data-bearing card, and card stop control means conditioned by the sensing pins of said one column selectively to position the card stop to arrest in the appropriate line-imprinting position thereof an impression-receiving card sensed by the said one column of pins during the sensing cycle preceding said second cycle.

4. A machine according to claim 3, wherein said card stop control means comprises a toothed rack movable with said stop, a toothed sector meshing with said rack, a rocking shaft to which said sector is secured for angular movement therewith, and shaft rocking means operable under control of the sensing pins of said predetermined column thereof to determine the extent of angular movement of the shaft.

5. A machine according to claim 4, including an arm secured to said rocking shaft for movement therewith from a starting position thereof, a manually settable control drum supported for angular movement about the axis of said shaft, a stop pin movable with said drum in a path concentric with and parallel to said axis to be engaged by said arm to determine the extent of angular movement of the shaft, and a locking device co-operating with the drum to secure it in a set position thereof.

6. A machine according to claim 5, including a second arm secured to said shaft for movement therewith, a second manually settable control drum supported for angular movement about the axis of said shaft, an operating pin carried by the second control drum and engaging said second arm thereby to effect angular movement of said shaft on angular movement of the second control drum, a second locking device co-operating with the second control drum to secure the drum in a set position thereof, and an interrupter device connecting said second drum with the stop control means and operable on movement of the second control drum from the starting position thereof to render said stop control means ineffective.

7. A machine according to claim 6, including a latching tooth carried by each said control drum, a first and a second pivoted latch to co-operate respectively with the latching tooth carried by the first and the second control drum, a latching abutment carried by the latch for one drum and arranged to co-operate with the latching tooth for the other said drum, a spring urging each latch towards the latching tooth to be engaged thereby, a latch pin carried by each said latch, and a camming member carried by each said drum for co-operation with the latch pin carried by the other drum whereby when one control drum is moved from the starting position thereof the other control drum is latched against manipulation to effect a setting thereof.

8. A machine of the kind described, comprising imprinting mechanism operable under control of a data-bearing record card to impart a line of imprinting to an impression-receiving card, a card stop selectively movable to locate an impression-receiving card in a line position to receive an impression from the imprinting mechanism, a sensing device operable in timed relation with said imprinting mechanism and including columns of sensing pins to sense perforations formed in record cards, one said column of sensing pins being effective only to sense perforations formed in interstage positions of impression-receiving cards, retaining means co-operating with the sensing pins of said one column to retain a sensing effected thereby for a second sensing cycle of the sensing device during which the pins of the other columns thereof sense a data-bearing card, connection elements connecting the pins of said other columns with the imprinting mechanism to control the setting thereof, card stop control means conditioned by the sensing pins of said one column selectively to position the card stop to arrest in the appropriate line-imprinting position thereof an impression-receiving card sensed by said one column of pins during the sensing cycle preceding said second cycle, and a punch operable simultaneously with said imprinting mechanisms to punch in an impression-receiving card a perforation indicative of the next line-imprinting position on the card.

9. A machine of the kind described, comprising imprinting mechanism operable under control of a data-bearing record card to impart a line of imprinting to an impression-receiving card, a card stop selectively movable to locate an impression-receiving card in a line position to receive an impression from the imprinting mechanism, a sensing device operable in timed relation with said imprinting mechanism and including columns of sensing pins to sense perforations formed in record cards, one said column of sensing pins being effective only to sense perforations formed in interstage positions of impression-receiving cards, a transmission rod aligned with each sensing pin for lengthwise movement thereby, an intermediate connecting element to effect co-operation between a sensing pin and its co-operating transmission rod, a first normally inactive shutter common to all connecting elements other than those co-operating with the sensing pins of said one column and operable during each sensing cycle of the sensing device to permit co-operation between its connecting elements and the sensing pins co-operating therewith and to restore the connecting elements to the inactive positions thereof, a second shutter common to all connecting elements co-operating with the sensing pins of said one column and operable during alternate sensing cycles of the sensing device to retain a sensing effected by the pins of said one column for a second sensing cycle during which the pins of the oher columns thereof sense a data-bearing card, connection elements connecting the transmission rods co-operating with the pins of said other columns with said imprinting mechanism to control the setting thereof, card stop control means conditioned by the sensing pins of said one column selectively to position the card stop to arrest in the appropriate line-imprinting position thereof an impression-receiving card sensed by the said one column of pins during the sensing cycle preceding said second cycle, and a punch operable simultaneously with said imprinting mechanism to punch in an impression-receiving card a perforation indicative of the next line-imprinting position on the card.

10. A machine according to claim 9, wherein said card stop control means comprises a toothed rack movable with said stop, a toothed sector meshing with said rack, a rocking shaft to which said sector is secured for angular movement therewith, and shaft rocking means operable under control of the sensing pins of said one column thereof to determine the extent of angular movement of the shaft.

11. A machine according to claim 10, including an arm secured to said rocking shaft for movement therewith from a starting position thereof, a manually settable control drum supported for angular movement about the axis of said shaft, a stop pin movable with said drum in a path concentric with and parallel to said axis to be engaged by said arm to determine the extent of angular movement of the shaft, and a locking device co-operating with the drum to secure it in a set position thereof.

12. A machine according to claim 11, including a second arm secured to said shaft for movement therewith, a second manually settable control drum supported for angular movement about the axis of said shaft, an operating pin carried by the second control drum and engaging said second arm thereby to effect angular movement of said shaft on angular movement of the second control drum, a second locking device co-operating with the second control drum to secure the drum in a set position thereof, and an interrupter device connecting said second drum with the stop control means and operable on movement of the second control drum from the starting position thereof to render said stop control means ineffective.

13. A machine according to claim 12, including a latching tooth carried by each said control drum, a first and second pivoted latch to co-operate respectively with the latching tooth carried by the first and the second control drum, a latching abutment carried by the latch for one drum and arranged to co-operate with the latching tooth for the other said drum, a spring urging each latch towards the latching tooth to be engaged thereby, a latch pin carried by each said latch, and a camming member carried by each said drum for co-operation with the latch pin carried by the other drum whereby when one control drum is moved from the starting position thereof the other control drum is latched against manipulation to effect a setting thereof.

14. A machine of the kind described, comprising imprinting mechanism operable under control of a data-bearing record card to impart a line of imprinting to an impression-receiving card, a sensing device operable in timed relation with the imprinting mechanism and including a sensing element operable during a first sensing cycle to sense an impression-receiving card and a group of sensing elements operable during a second sensing cycle to sense a data-bearing card, connection means connecting said group of sensing elements with said imprinting mechanism to effect setting thereof, a card stop selectively movable to locate an impression-receiving card in a line position to receive an impression from the imprinting mechanism, a toothed rack movable with said stop, a toothed sector meshing with said rack, a rocking shaft to which said sector is secured for angular movement therewith, shaft rocking means selectively to effect angular movement of said shaft and position the card stop to arrest the impression-receiving card in the appropriate line-imprinting position thereof, and means connecting said one sensing element and shaft rocking means to control operation of the rocking shaft.

15. A machine of the kind described, comprising imprinting mechanism operable under control of a data-bearing record card to impart a line of imprinting to an impression-receiving card, a card stop selectively movable to locate an impression-receiving card in a line position to receive an impression from the imprinting mechanism, a sensing device operable in timed relation with the imprinting mechanism and including sensing element operable during a first sensing cycle to sense an impression-receiving card and a group of sensing elements operable during a second sensing cycle to sense a data-bearing card, connection means connecting said group of sensing elements with said imprinting mechanism to effect setting thereof, a toothed rack movable with said stop, a toothed sector meshing with said rack, a rocking shaft to which said sector is secured for angular movement therewith, shaft rocking means selectively to effect angular movement of said shaft and position the card stop to arrest an impression-receiving card in the appropriate line-imprinting position thereof, means connecting said one sensing element and shaft rocking means to control operation of the rocking shaft, and means operable simultaneously with the imprinting mechanism to apply line-finding indicia to an impression-receiving card.

16. A machine of the kind described, comprising imprinting mechanism operable under control of a data-bearing record card to impart a line of imprinting to an impression-receiving card, a card stop selectively movable to locate an impression-receiving card in a line position to receive an impression from the imprinting mechanism, a sensing device operable in timed relation with said imprinting mechanism and including columns of sensing pins to sense perforations formed in record cards, one said column of sensing pins being effective only to sense perforations formed in interstage positions of impression-receiving cards, retaining means co-operating with the sensing pins of said one column to retain a sensing effected thereby for a second sensing cycle of the sensing device during which the pins of the other columns thereof sense a data-bearing card, connection elements connecting the pins of said other columns with the imprinting mechanism to control the setting thereof, card stop control means conditioned by the sensing pins of said one column selectively to position the card stop to arrest in the appropriate line-imprinting position thereof an impression-receiving card sensed by said one column of pins during the sensing cycle preceding said second cycle, a toothed rack movable with said stop, a toothed sector meshing with said rack, a rocking shaft to which said sector is secured for angular movement therewith, shaft rocking means operable under control of said one column of sensing pins selectively to effect angular movement of said shaft and position the card stop to arrest an impression-receiving card in the appropriate line-imprinting position thereof, and a punch operable simultaneously with said imprinting mechanism to punch in an impression-receiving card a perforation indicative of the next line-imprinting position on the card.

References Cited in the file of this patent

UNITED STATES PATENTS

| | | |
|---|---|---|
| 1,506,382 | Pierce | Aug. 26, 1924 |
| 1,881,090 | Moulton | Oct. 4, 1932 |
| 1,967,675 | Long | July 24, 1934 |
| 2,016,709 | Eichenhauer | Oct. 8, 1935 |
| 2,084,097 | Long | June 15, 1937 |
| 2,111,116 | Holzapfel | Mar. 15, 1938 |
| 2,157,980 | Daubmeyer | May 9, 1939 |
| 2,233,158 | Connor | Feb. 25, 1941 |
| 2,281,577 | Haynes | May 5, 1942 |